(12) United States Patent
Kim

(10) Patent No.: US 11,942,823 B2
(45) Date of Patent: Mar. 26, 2024

(54) MOTOR

(71) Applicant: LG INNOTEK CO., LTD., Seoul (KR)

(72) Inventor: Tae Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 528 days.

(21) Appl. No.: 17/271,711

(22) PCT Filed: Aug. 27, 2019

(86) PCT No.: PCT/KR2019/010884
§ 371 (c)(1),
(2) Date: Feb. 26, 2021

(87) PCT Pub. No.: WO2020/050535
PCT Pub. Date: Mar. 12, 2020

(65) Prior Publication Data
US 2021/0320540 A1  Oct. 14, 2021

(30) Foreign Application Priority Data

Sep. 3, 2018 (KR) .................. 10-2018-0104808

(51) Int. Cl.
*H02K 1/18* (2006.01)
*H02K 1/14* (2006.01)
(Continued)

(52) U.S. Cl.
CPC ............. *H02K 1/18* (2013.01); *H02K 1/148* (2013.01); *H02K 1/165* (2013.01); *H02K 3/345* (2013.01); *B62D 5/04* (2013.01); *H02K 2213/03* (2013.01)

(58) Field of Classification Search
CPC .......... H02K 1/18; H02K 1/148; H02K 1/165; H02K 3/345
See application file for complete search history.

(56) References Cited

U.S. PATENT DOCUMENTS 5,583,387 A * 12/1996 Takeuchi ................. H02K 1/16
174/DIG. 20
5,729,072 A *  3/1998 Hirano .................... H02K 1/148
310/179

(Continued)

FOREIGN PATENT DOCUMENTS

EP    3 176 912 A1   6/2017
JP    10-155248 A    6/1998
(Continued)

OTHER PUBLICATIONS

International Search Report dated Dec. 6, 2019 in International Application No. PCT/KR2019/010884.
(Continued)

*Primary Examiner* — Robert W Horn
(74) *Attorney, Agent, or Firm* — Saliwanchik, Lloyd & Eisenschenk

(57) ABSTRACT

An embodiment relates to a motor comprising: a shaft; a rotor coupled to the shaft; and a stator disposed on the outside of the rotor, wherein the stator comprises a stator core, an insulator disposed on the stator core, and a coil wound around the insulator, and the stator core is formed by arranging a plurality of unit stator cores in the circumferential direction, and a welded portion is formed by welding regions where unit yokes of the unit stator cores meet each other on the upper side and the lower side of the stator core. Accordingly, cogging torque and torque ripple of the motor may be reduced.

9 Claims, 9 Drawing Sheets

(51) Int. Cl.
    *H02K 1/16*    (2006.01)
    *H02K 3/34*    (2006.01)
    *B62D 5/04*    (2006.01)

(56) References Cited

U.S. PATENT DOCUMENTS

| | | | | |
|---|---|---|---|---|
| 6,049,153 | A * | 4/2000 | Nishiyama | H02K 1/276 |
| | | | | 310/216.057 |
| 8,294,326 | B2 * | 10/2012 | Chai | H02K 1/148 |
| | | | | 310/216.086 |
| 9,000,629 | B2 * | 4/2015 | Yokogawa | H02K 15/03 |
| | | | | 310/43 |
| 9,438,075 | B2 * | 9/2016 | Li | H02K 1/148 |
| 9,502,939 | B2 * | 11/2016 | Kinpara | H02K 1/16 |
| 10,468,922 | B2 * | 11/2019 | Endo | H02K 1/276 |
| 10,910,901 | B2 * | 2/2021 | Burch | H02K 3/38 |
| 11,005,314 | B2 * | 5/2021 | Kong | H02K 1/272 |
| 11,469,637 | B2 * | 10/2022 | Suzuki | H02K 1/148 |
| 2013/0026878 | A1 * | 1/2013 | Feuerrohr | A23L 2/52 |
| | | | | 310/216.136 |
| 2016/0276892 | A1 * | 9/2016 | Kim | H02K 3/32 |
| 2018/0006511 | A1 * | 1/2018 | Kong | H02K 3/345 |
| 2018/0034336 | A1 * | 2/2018 | Mori | H02K 1/148 |
| 2020/0235629 | A1 * | 7/2020 | Dolnicki | H02K 1/18 |
| 2023/0208215 | A1 * | 6/2023 | Ichien | H02K 1/148 |
| | | | | 310/254.1 |
| 2023/0261532 | A1 * | 8/2023 | Takemoto | H02K 3/325 |
| | | | | 310/216.009 |

FOREIGN PATENT DOCUMENTS

| | | |
|---|---|---|
| JP | 2000-184634 A | 6/2000 |
| JP | 2000-333388 A | 11/2000 |
| JP | 2002-233084 A | 8/2002 |
| JP | 2002-262485 A | 9/2002 |
| JP | 2012-205444 A | 10/2012 |
| KR | 10-2018-0005911 A | 1/2018 |
| WO | WO-2012/105261 A1 | 8/2012 |
| WO | 2018/008880 A1 | 1/2018 |
| WO | WO-2018/051407 A1 | 3/2018 |

OTHER PUBLICATIONS

Office Action dated Jun. 6, 2023 in Japanese Application No. 2021-512273.
Supplementary European Search Report dated Sep. 23, 2021 in European Application No. 19857586.2.

* cited by examiner

MOTOR

CROSS-REFERENCE TO RELATED APPLICATIONS

This application is the U.S. national stage application of International Patent Application No. PCT/KR2019/010884, filed Aug. 27, 2019, which claims the benefit under 35 U.S.C. § 119 of Korean Application No. 10-2018-0104808, filed Sep. 3, 2018, the disclosures of each of which are incorporated herein by reference in their entirety.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

Particularly, as more electric devices are used in a vehicle, demands for a motor applied to a steering system, a braking system, a machinery system, and the like are significantly increasing.

For example, an electronic power steering (EPS) system, in which the motor is used, secures turning stability and provides a rapid restoring force using an electronic control unit configured to control driving of the motor according to operating conditions. Accordingly, a driver of the vehicle can travel safely.

The motor may include a housing, a shaft, a stator disposed on an inner circumferential surface of the housing, a rotor installed on an outer circumferential surface of the shaft, and the like. In this case, an electrical interaction may be induced between the stator and the rotor so that the rotor may rotate.

A stator core of the stator may be formed as a single product, or a plurality of divided cores may be disposed in a circumferential direction to form the stator core.

In the case in which the plurality of divided cores are used to form the stator core, a cogging torque and a torque ripple are reduced when compared to the case in which the stator core is formed as the single product.

However, in a case in which a welding line is formed on a side surface of the stator core through a welding process, there is also a problem of increasing the cogging torque and the torque ripple. For example, when the welding line is formed on the side surface of the stator core formed as the plurality of divided cores, cogging torque and torque ripple quality thereof is degraded like the stator core formed as the single product.

Since the cogging torque and the torque ripple become causes of noise and vibration of the motor, reducing the cogging torque and the torque ripple is more important than other factors in improving quality of the motor.

Accordingly, there is a need for a motor with a structure capable of reducing a cogging torque and a torque ripple to reduce noise and vibration.

Technical Problem

The present invention is directed to providing a motor in which an uppermost end plate and a lowermost end plate are integrally formed when the plates are stacked on each other to form a stator core.

In addition, the present invention is directed to providing a motor allowing a cogging torque and a torque ripple to be reduced by welding one region of a stator core through a welding method when plates are stacked on each other to from unit stators, and the unit stators are disposed in a circumferential direction to from the stator core.

Objectives to be solved by the present invention are not limited to the above-described objectives, and other objectives which are not described above will be clearly understood by those skilled in the art from the following specification.

Technical Solution

One aspect of the present invention provides a motor including a shaft, a rotor coupled to the shaft, and a stator disposed to correspond to the rotor, wherein the stator includes a stator core formed by arranging a plurality of unit stator cores in a circumferential direction, a welding portion connecting the plurality of unit stator cores, an insulator disposed on the stator core, and a coil wound around the insulator, the unit stator core is formed by stacking a plurality of sheets, each of the plurality of sheets includes a yoke part having an arc shape and a tooth part protruding from the yoke part in a radial direction, and the welding portion is disposed on an upper surface of the yoke part disposed at an uppermost side of the plurality of unit stator cores or on a lower surface of the yoke part disposed at a lowermost side of the plurality of unit stator cores.

The welding portion may be disposed at a boundary portion between the plurality of unit stator cores which are adjacent to each other.

A width of the welding portion in the radial direction may be 0.4 to 0.6 times a width of the yoke or yoke part in the radial direction.

The insulator may include a body around which the coil is wound, an inner guide protruding from an inner side of the body in a shaft direction, an outer guide protruding from an outer side of the body in the shaft direction, and a protrusion protruding from the outer guide in the circumferential direction, wherein the protrusion may be disposed to cover one portion of the upper surface of the yoke part disposed at the uppermost side of the plurality of unit stator cores or the lower surface of the yoke part disposed at the lowermost side of the plurality of unit stator cores.

The welding portion may be disposed on the upper or lower surface, on which the protrusion is not disposed, of the yoke part. For example, in this case, a welding point on which the welding portion is formed may be exposed due to the protrusion, and the welding portion may be formed on the exposed welding point.

Another aspect of the present invention provides a motor including a shaft, a rotor coupled to the shaft, and a stator disposed to correspond to the rotor, wherein the stator incudes a stator core, an insulator disposed on the stator core, and a coil wound around the insulator, the stator core includes a plurality of unit stator cores disposed in a circumferential direction, cover sheets disposed on the unit stator cores, and welding portions connecting the plurality of unit stator cores and the cover sheets, the unit stator core is formed by stacking a plurality of sheets, and the cover sheet includes a yoke part having a ring shape and a plurality of tooth parts protruding from the yoke part in a radial direction.

The welding portions may be disposed on the unit stator core and an outer surface of the cover sheet.

The cover sheets may include an upper cover sheet disposed on an upper portion of the unit stator core and a lower cover sheet disposed on a lower portion of the unit stator core, and the welding portions may be disposed at a boundary portion between a sheet disposed at an uppermost side of the unit stator core and the upper cover sheet, and a boundary portion between a sheet disposed at a lowermost side of the unit stator core and the lower cover sheet. For example, unit yokes of the unit stator cores may meet at a region along an outer circumferential surface of the stator core, and a welding portion may be formed at one point (P) at which the region meets an outer circumferential surface of the cover sheet.

Still another aspect of the present invention provides a motor including a shaft, a rotor coupled to the shaft, and a stator disposed to correspond to the rotor, wherein the stator includes a stator core formed by arranging a plurality of unit stator cores in a circumferential direction, welding portions connecting the plurality of unit stator cores, an insulator disposed on the stator core, and a coil wound around the insulator, the insulator includes a body around which the coil is wound, an inner guide protruding from an inner side of the body in a shaft direction, an outer guide protruding from an outer side of the body in the shaft direction, and protrusions protruding from the outer guide in the circumferential direction, the unit stator core includes a unit yoke having an arc shape and a unit tooth protruding from the unit yoke, and the protrusions are disposed to cover one portions of upper and lower surfaces of the unit yoke.

The welding portions may be disposed on the upper and lower surfaces, on which the protrusions are not disposed, of the unit yoke. For example, one portion of a region in which unit yokes of the unit stator core meet each other on an upper surface of the stator core may be exposed due to the protrusion. In addition, the welding portion may be formed in the exposed region through a welding process.

A width of the welding portion in a radial direction may be 0.4 to 0.6 times a width of the unit yoke in the radial direction.

The welding portion may be formed through a laser welding process.

Advantageous Effects

According to embodiments, a cogging torque and a torque ripple of a motor can be reduced by stacking sheets on each other to form unit stator cores, arranging the unit stator cores in a circumferential direction to form a stator core, and welding one region of the stator core.

Particularly, in the case of a multi-pole motor with ten poles and twelve slots, although greater noise and vibration are generated than other motors, the cogging torque and the torque ripple of the motor can be reduced by performing welding on one portion of a region in which the unit stator cores are in contact with each other. Accordingly, the noise and vibration of the motor can be reduced.

In this case, the cogging torque and the torque ripple can be further reduced by forming a welding portion through a welding process at one portion (region in which the unit stators are close to each other to form an air gap) of each of an upper surface and a lower surface of the stator core.

In addition, uniform quality of the motor can be maintained by restricting the limit of a range in which the welding portion is formed using a protrusion formed on an insulator.

Various useful advantages and effects of the embodiments are not limited to the above-described contents and will be more easily understood from descriptions of the specific embodiments.

MODES OF THE INVENTION

Figure 1:
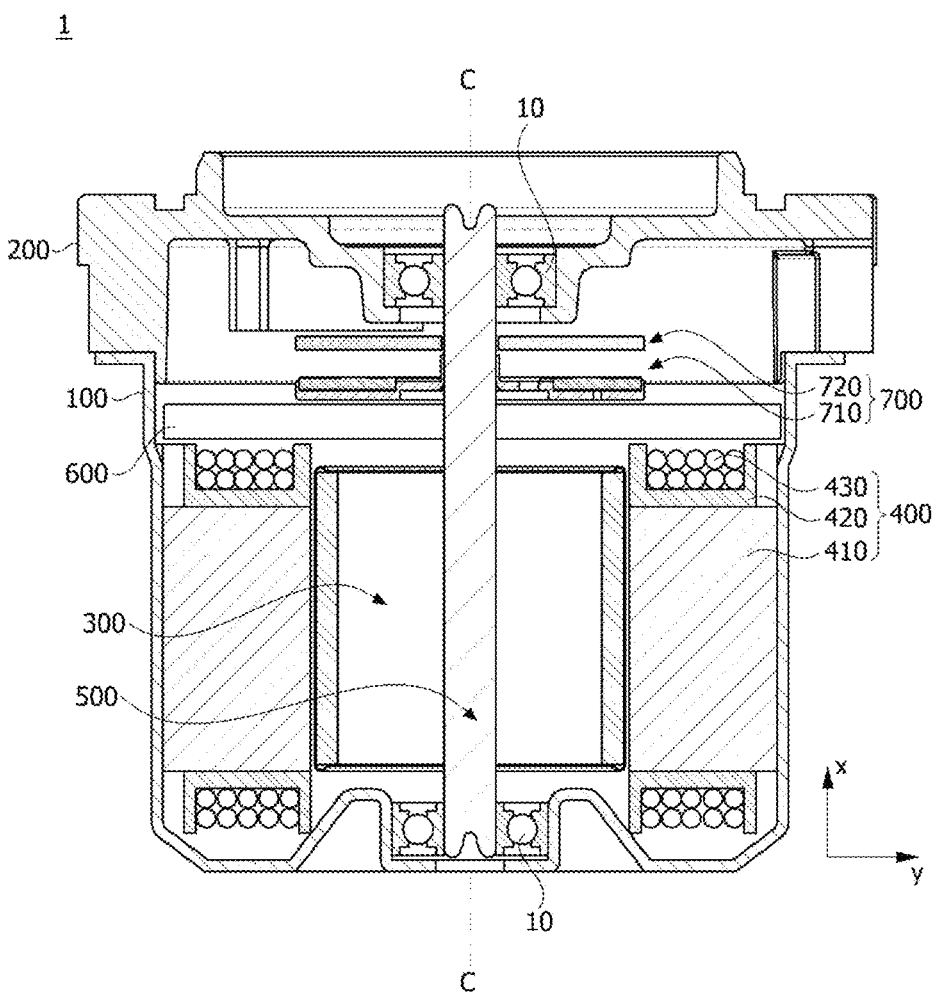
FIG. 1 is a view illustrating a motor according to an embodiment.

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

Figure 2:
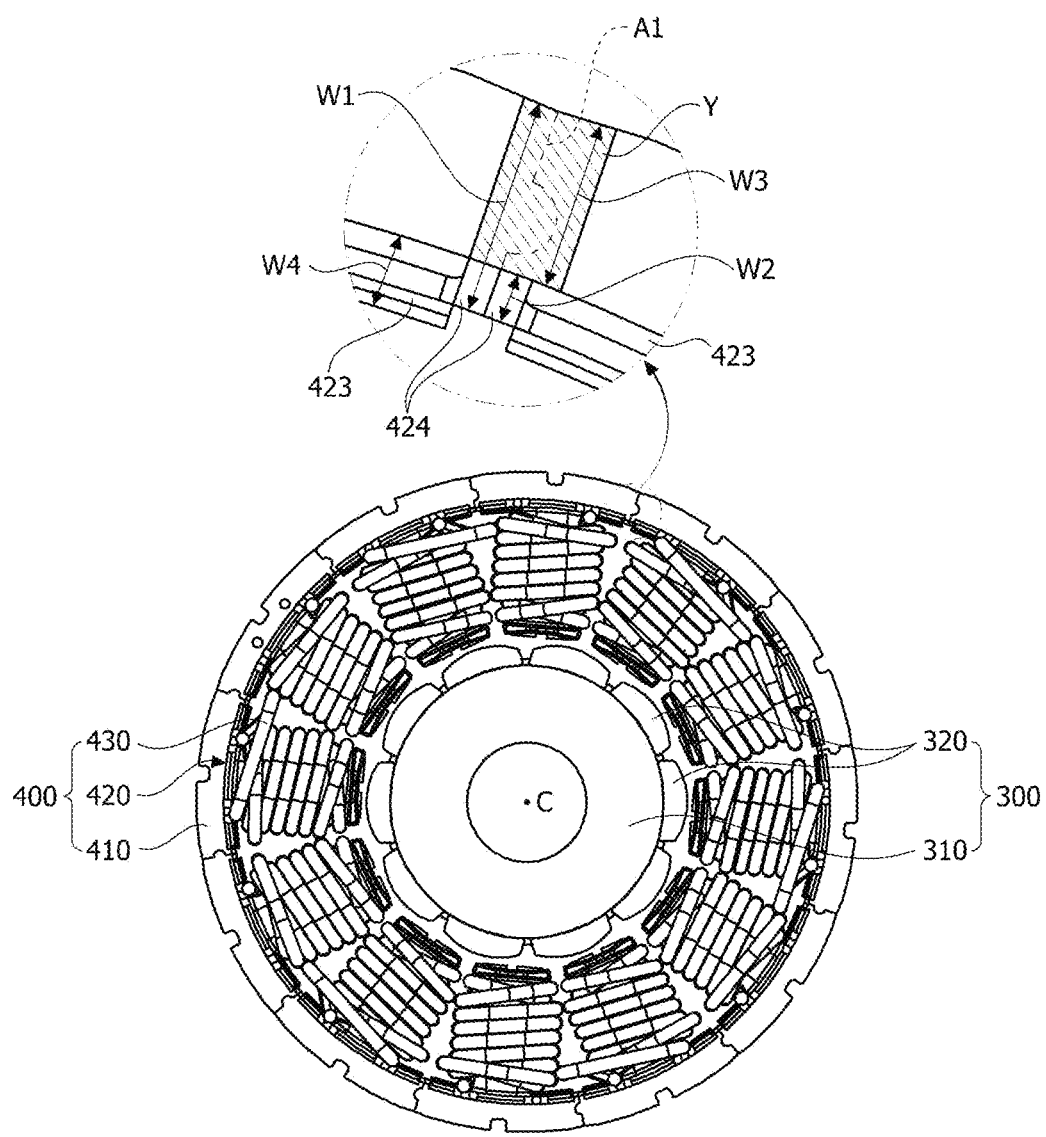
FIG. 2 is a view illustrating a rotor and a stator of the motor according to the embodiment.
Figure 3:
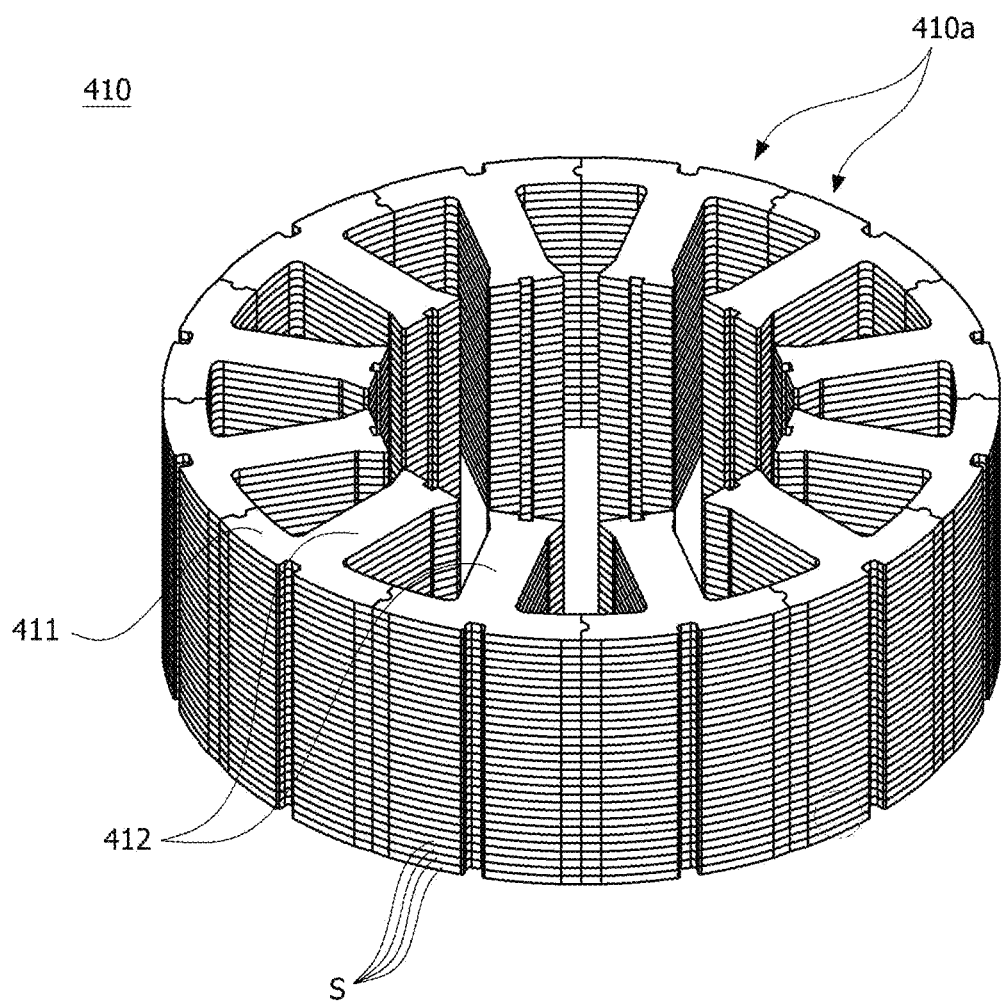
FIG. 3 is a perspective view illustrating one example of a stator core of the motor according to the embodiment.

FIG. 1 is a view illustrating a motor according to an embodiment, FIG. 2 is a view illustrating a rotor and a stator of the motor according to the embodiment, and FIG. 3 is a perspective view illustrating one example of a stator core of the motor according to the embodiment. In FIG. 1, an x direction may be referred to as a shaft direction, and a y direction may be referred to as a radial direction. In addition, the shaft direction may be perpendicular to the radial direction.

Referring to FIGS. 1 and 2, a motor 1 according to the embodiment may include a housing 100 in which an opening is formed at one side, a cover 200 disposed on the housing 100, a rotor 300 coupled to a shaft 500, a stator 400 disposed in the housing 100, the shaft 500 configured to rotate with the rotor 300, a busbar 600 disposed on the stator 400, and a sensor part 700 configured to detect rotation of the rotor 300. Here, the stator 400 may be disposed to correspond to the rotor 300. In this case, the rotor 300 of the motor 1 may include ten magnets 320, and the stator 400 may include twelve teeth 412.

Referring to FIG. 3, a stator core 410 according to one embodiment that is disposed in the stator 400 may be formed by arranging a plurality of unit stator cores 410a in a circumferential direction. In this case, the stator core 410 according to one embodiment may be referred to as a first stator core.

The unit stator core 410a may be formed by stacking a plurality of sheets S in the shaft direction. In this case, fine air gaps may be formed between the unit stator cores 410a, and the air gaps become a factor to reduce a cogging torque and a torque ripple of the motor 1.

However, since a fixing force between the unit stator cores 410a due to the air gap should be considered, welding may be performed on some of the air gaps formed between the unit stator cores 410a to connect the unit stator cores 410a so as to secure the coupling force. In addition, due to partial welding, a formation amount of air gap formed between the unit stator cores 410a may be maintained to match with a preset amount thereof.

Accordingly, when welding portions Y are formed by welding one portions of regions A at which unit yokes 411a of the unit stator cores 410a meet on an upper surface and a lower surface of the stator core 410 in the shaft direction, a cogging torque and a torque ripple of the motor 1 may be reduced. Accordingly, noise and vibration of the motor 1 may also be reduced.

The motor 1 may be a motor used in an electronic power steering (EPS) system. The EPS system may assist a steering force using a driving force of the motor to secure turning stability and provide a rapid restoring force of a vehicle. Accordingly, a driver of the vehicle can travel safely.

The housing 100 and the cover 200 may form an exterior of the motor 1. In addition, the housing 100 may be coupled to the cover 200 to form an accommodation space. Accordingly, as illustrated in FIG. 1, the rotor 300, the stator 400, the shaft 500, the busbar 600, the sensor part 700, and the like may be disposed in the accommodation space. In this case, the shaft 500 is rotatably disposed in the accommodation space. Accordingly, the motor 1 may further include bearings 10 disposed on an upper portion and a lower portion of the shaft 500.

The housing 100 may be formed in a cylindrical shape. In addition, the rotor 300, the stator 400, and the like may be accommodated in the housing 100. In this case, the shape or material of the housing 100 may be variously changed. For example, the housing 100 may be formed of a metal material which firmly withstands even at high temperature.

The cover 200 may be disposed on an open surface of the housing 100, that is, an upper portion of the housing 100, to cover an opening of the housing 100.

Referring to FIGS. 1 and 2, the rotor 300 may be disposed inside the stator 400, and the shaft 500 may be coupled to a central portion of the rotor 300 through a press-fitting method. In this case, the term "inside" may be referred to as a direction toward a center C, and the term "outside" may be referred to as a direction opposite to the term "inside."

In addition, the rotor 300 may be rotatably disposed inside the stator 400.

Referring to FIG. 2, the rotor 300 may include a rotor core 310 and a plurality of magnets 320 disposed on an outer circumferential surface of the rotor core 310 in the circumferential direction.

As illustrated in FIG. 2, ten magnets 320 may be disposed on the outer circumferential surface of the rotor core 310 to be spaced apart from each other at preset intervals. In this case, the magnets 320 may be referred to as rotor magnets or drive magnets. In this case, an example, in which the plurality of magnets 320 are disposed on the outer circumferential surface of the rotor core 310 of the rotor 300, is illustrated, but the present invention is not necessarily limited thereto. For example, the rotor 300 may also be formed as an interior permanent magnet (IPM) rotor in which magnets 320 are disposed in a rotor core 310.

The rotor core 310 may be formed in a form, in which a plurality of circular thin steel plates are stacked on each other, or a single cylindrical form. In addition, a hole coupled to the shaft 500 may be formed at a center C of the rotor core 310.

The magnets 320 generate a rotating magnetic field with coils 430 wound around the stator core 410 of the stator 400. The magnets 320 may be disposed so that an N-pole and an S-pole are alternately disposed around the shaft 500 in the circumferential direction.

Accordingly, due to an electrical interaction between the coils 430 and the magnets 320, the rotor 300 is rotated, and the shaft 500 is rotated in conjunction with the rotation of the rotor 300 so that a driving force of the motor 1 is generated.

Meanwhile, the rotor 300 may further include a can (not shown) disposed to cover the rotor core 310 to which the magnets 320 are attached.

The can may protect the rotor core 310 and the magnets 320 from external shocks and physical and chemical stimuli while inhibiting foreign materials from being introduced to the rotor core 310 and the magnets 320.

In addition, the can inhibits the magnets 320 from being separated from the rotor core 310.

The stator 400 may be disposed inside the housing 100. In this case, the stator 400 may be coupled to the housing 100 through a hot press fitting method. Accordingly, the stator 400 may be supported by an inner circumferential surface of the housing 100. In addition, the stator 400 is disposed outside the rotor 300. That is, the rotor 300 may be rotatably disposed inside the stator 400.

Referring to FIGS. 1 and 2, the stator 400 may include the stator core 410, insulators 420 disposed on the stator core 410, and the coils 430 wound around the insulators 420. In this case, the insulators 420 may be disposed between the stator core 410 and the coils 430 to insulate the coils 430.

The coils 430 configured to generate the rotating magnetic field may be wound around the stator core 410.

Referring to FIG. 3, the stator core 410 may be formed by arranging the plurality of unit stator cores 410a in the circumferential direction.

The stator core 410 may include a yoke 411, the teeth 412 protruding from the yoke 411 in the radial direction, and the welding portions Y formed on the yoke 411. In this case, the yoke 411 may be formed to have a predetermined width W1 in the radial direction.

The yoke 411 may be formed in a cylindrical shape. In this case, unit yokes 411a of the unit stator cores 410a may be disposed in the circumferential direction to form the yoke 411.

The plurality of teeth 412 may be disposed to protrude from an inner circumferential surface of the yoke 411 in the radial direction. In this case, the teeth 412 may be disposed to be spaced apart from each other in the circumferential direction. Accordingly, slots may be formed between the teeth 412 for winding the coils 430. In this case, the tooth 412 may be a unit tooth 412a of the unit stator core 410a.

In addition, the coil 430 may be wound around the tooth 412. In this case, the insulator 420 may be disposed between the tooth 412 and the coil 430 to insulate the tooth 412 from the coil 430.

Figure 4:
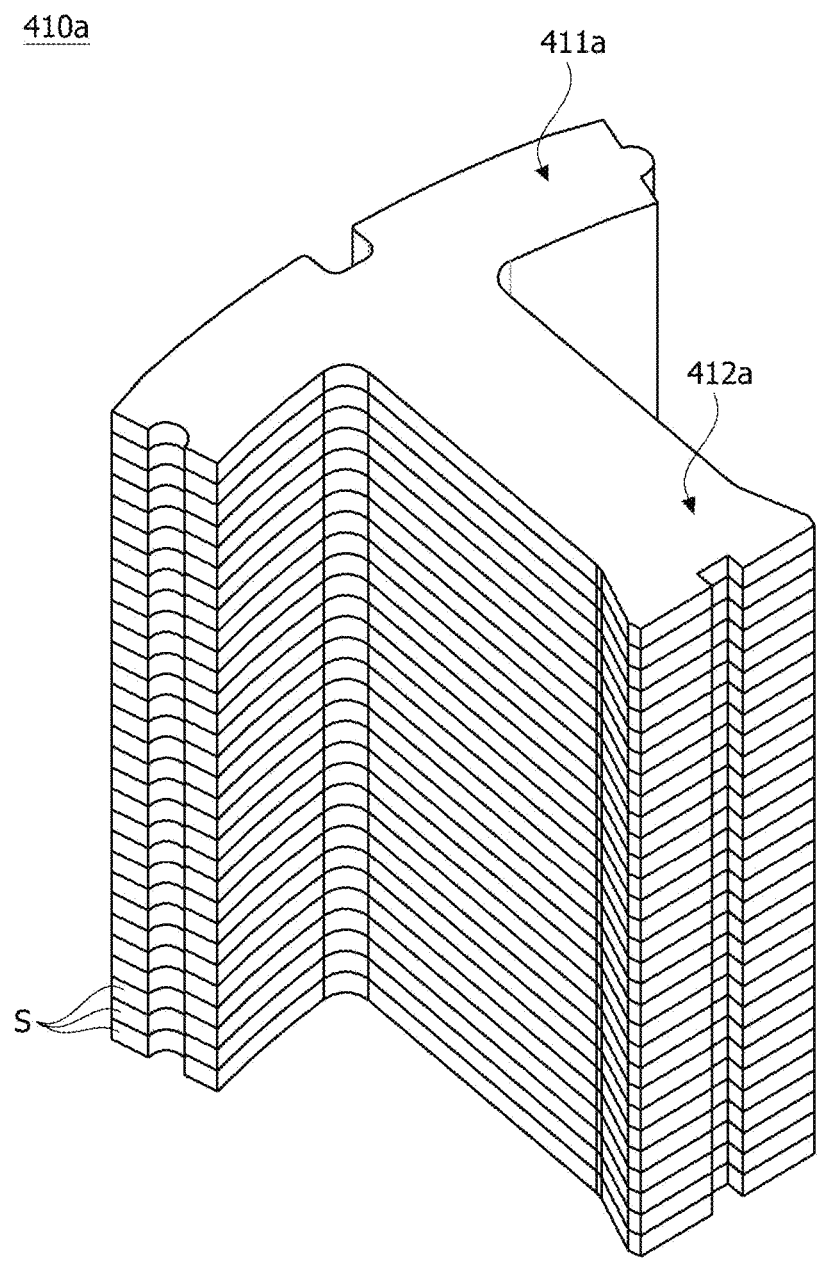
FIG. 4 is a perspective view illustrating a unit stator core of the motor according to the embodiment.
Figure 5:
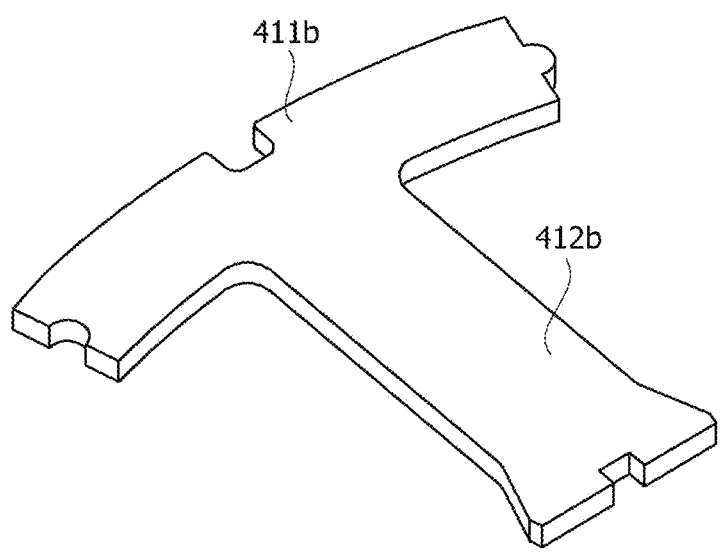
FIG. 5 is a perspective view illustrating a sheet of the unit stator core of the motor according to the embodiment.

FIG. 4 is a perspective view illustrating the unit stator core of the motor according to the embodiment, and FIG. 5 is a perspective view illustrating the sheet of the unit stator core of the motor according to the embodiment.

Referring to FIG. 4, the unit stator core 410a may include the unit yoke 411a having an arc shape and the unit tooth 412a protruding from the unit yoke 411a in the radial direction.

In this case, the unit stator core 410a may be formed by stacking a plurality of thin steel sheets S.

Referring to FIG. 5, the sheets S may include yoke parts 411b and tooth parts 412b protruding from the yoke parts 411b in the radial direction.

In addition, since the sheets S are stacked on each other in the shaft direction, the plurality of yoke parts 411b may form the unit yoke 411a, and the plurality of tooth parts 412b may form the unit tooth 412a. In this case, the welding portion Y may be disposed on an upper surface of the yoke part 411b disposed at an uppermost side of the plurality of unit stator cores 410a or on a lower surface of the yoke part 411b disposed at a lowermost side of the plurality of unit stator cores 410a.

The insulator 420 may be formed of a synthetic resin material to insulate the stator core 410 from the coil 430. In addition, the coil 430 may be wound around the stator core 410 on which the insulator 420 is disposed. Accordingly, the coil 430 may form the rotating magnetic field when power is supplied thereto.

The insulators 420 may be coupled to an upper side and a lower side of the stator core 410. In this case, the insulators 420 may also be formed as one single product so as to be coupled to the stator core 410. Alternatively, a plurality of unit insulators may also be formed as the insulators 420 so that the insulators 420 are disposed on the stator core 410 in the circumferential direction.

Figure 6:
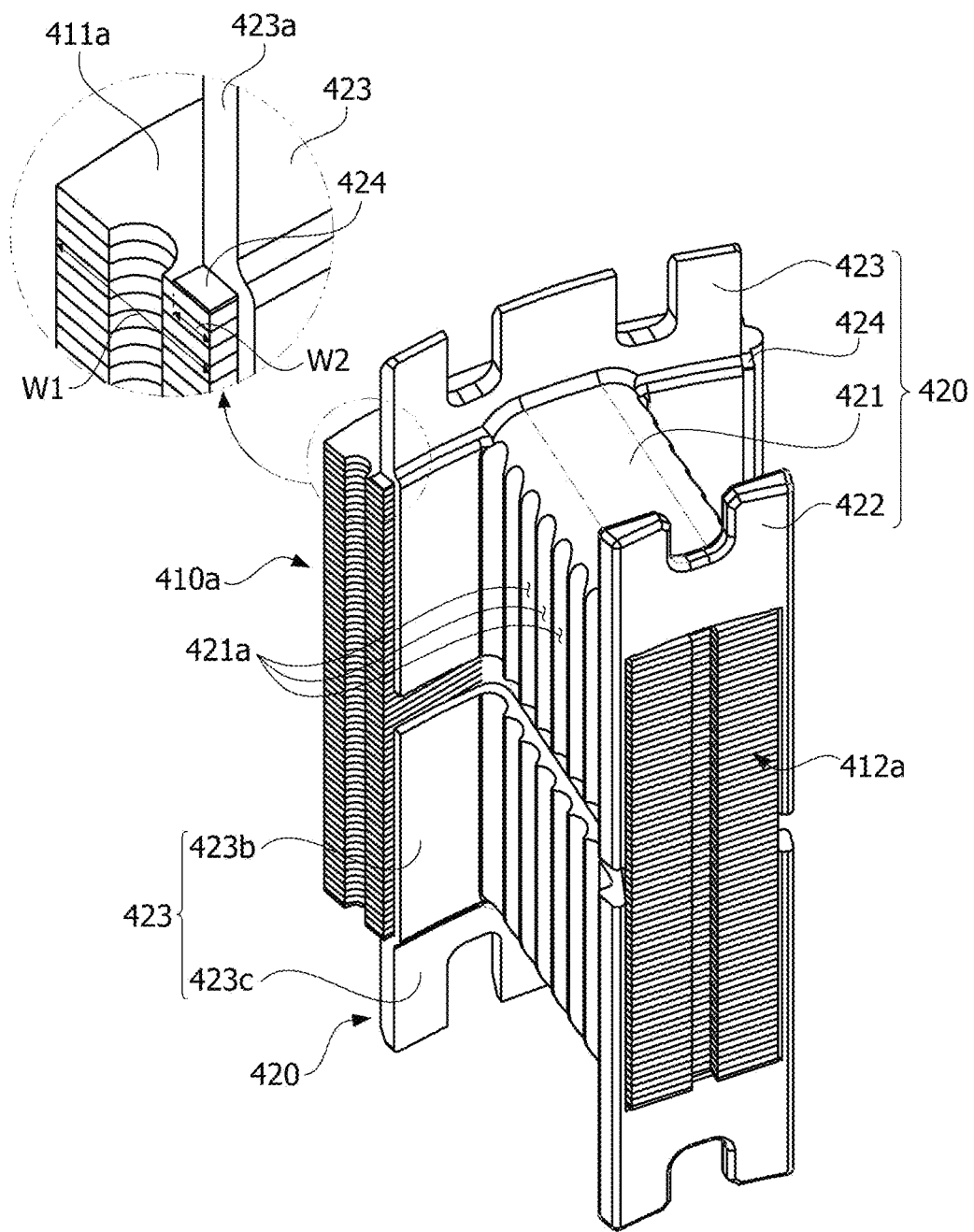
FIG. 6 is a perspective view illustrating the unit stator core and an insulator of the motor according to the embodiment.

FIG. 6 is a perspective view illustrating the unit stator core and the insulator of the motor according to the embodiment.

Referring to FIG. 6, the insulator 420 may include a body 421 around which the coil 430 is wound, an inner guide 422 extending to protrude from an inner side of the body 421 in the shaft direction, an outer guide 423 extending to protrude from an outer side of the body 421 in the shaft direction, and protrusions 424 protruding from the outer guide 423 in the circumferential direction. In this case, the protrusions 424 may protrude from one lower regions of side surfaces 423a of the outer guide 423 in the circumferential direction. Accordingly, the protrusions 424 may be disposed to cover one portions of an upper surface and a lower surface of the yoke 411 forming the stator core 410.

In this case, the body 421, the inner guide 422, the outer guide 423, and the protrusions 424 may be integrally formed.

The coil 430 may be wound around the body 421.

The body 421 may be disposed on the tooth 312 of the stator core 410 to insulate the stator core 410 from the coil 430.

The body 421 may be formed in a "c" shape, and grooves 421a may be formed in an outer surface of the body 421. In this case, the groove 421a may be concavely formed in a groove shape. In addition, when the coil 430 is wound around the body 421, the groove 421a may guide an arrangement of the coil 430.

The inner guide 422 may be disposed at an inner side of the body 421. As illustrated in FIG. 6, the inner guide 422 may be formed to protrude from an inner side of the body 421 in the shaft direction and in the circumferential direction. In this case, the shaft direction may be a longitudinal direction of the shaft 500.

Accordingly, the inner guide 422 may support the coil 430 wound around the body 421 to inhibit the coil 430 from being separated inward from the body 421.

The outer guide 423 may be disposed at an outer side of the body 421. As illustrated in FIG. 6, the outer guide 423 may be formed to protrude from the outer side of the body 421 in the shaft direction and the circumferential direction. Accordingly, the outer guide 423 may include a first outer guide part 423b disposed on an inner circumferential surface of the unit yoke 411a and a second outer guide part 423c disposed in the shaft direction with respect to the unit yoke 411a. In this case, the first outer guide part 423b and the second outer guide part 423c may be integrally formed.

In this case, the outer guide 423 may be disposed so that one portion, which protrudes in the shaft direction, of the outer guide 423 is disposed on the unit yoke 411a. For example, the second outer guide part 423c may be disposed to protrude in the shaft direction from the unit yoke 411a. Accordingly, the second outer guide part 423c of the outer guide 423 may be disposed to overlap one region of the unit yoke 411a in the shaft direction.

The outer guide 423 may support the coil 430 wound around the body 421 to inhibit the coil 430 from being separated outward from the body 421.

Referring to FIG. 6, the protrusions 424 may protrude from the side surfaces 423a of the outer guide 423 in the circumferential direction. In this case, the protrusions 424 may be disposed to cover one portions of an upper surface and a lower surface of the unit yoke 411a. In addition, the protrusions 424 may be disposed inside the upper surface and the lower surface of the unit yoke 411a. In this case, the protrusion 424 may be formed to have a predetermined width W2 in the radial direction. In this case, the width W2 of the protrusion 424 in the radial direction is smaller than a width W4 of the outer guide 423 in the radial direction.

Meanwhile, the protrusion 424 may be formed in a plate shape having a predetermined height based on the upper surface of the unit yoke 411a in the shaft direction. In this case, the height of the protrusion 424 in the shaft direction is smaller than a height of the outer guide 423 in the shaft direction based on the upper surface of the yoke 411.

When it is considered that the protrusion 424 is disposed to cover one portion of the unit yoke 411a, although the outer guide 423 may also extend in the circumferential direction instead of the protrusion 424, forming the protrusion 424 to protrude from the side surface 423a of the outer guide 423 is advantageous for reducing a material cost.

Figure 7:
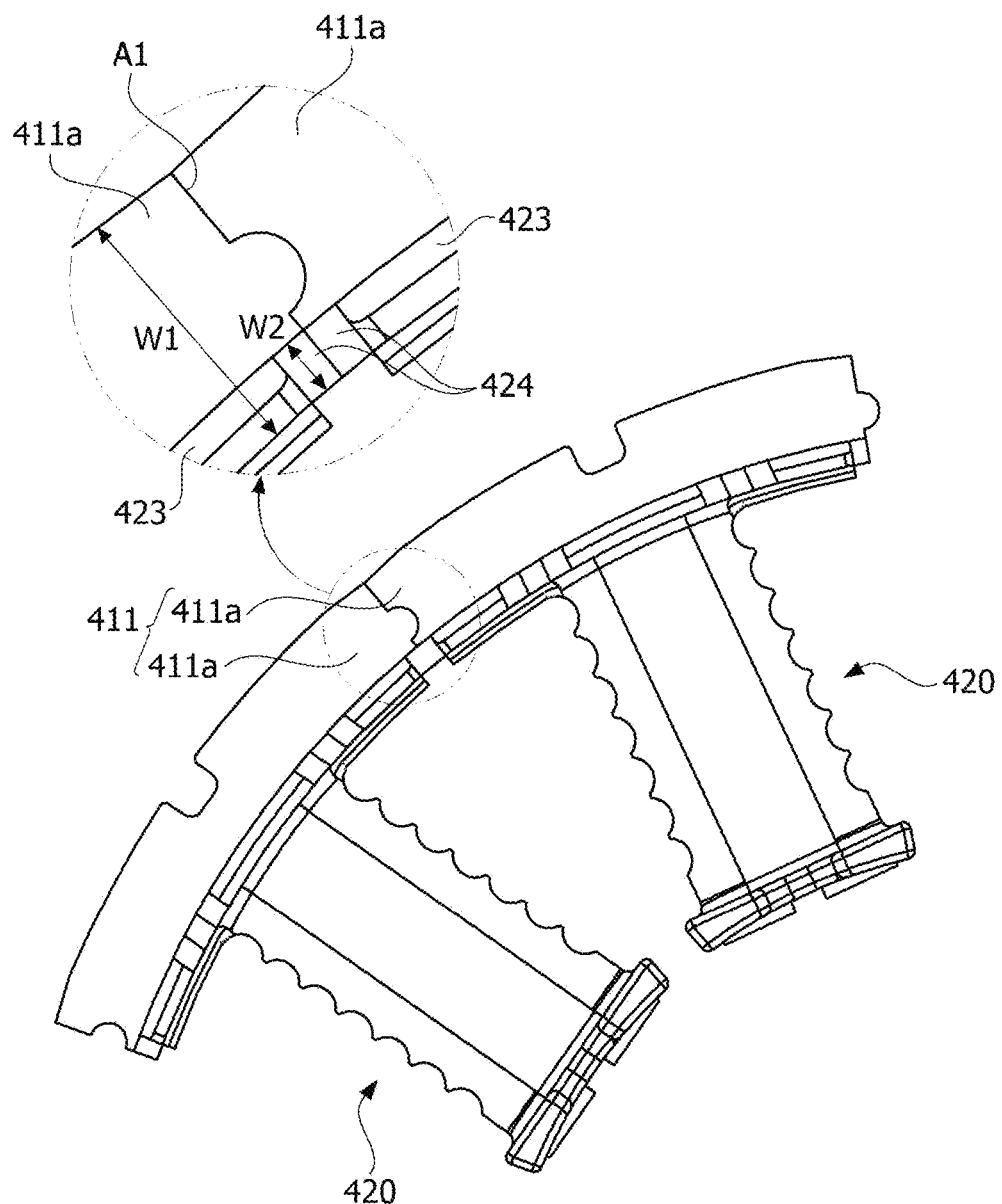
FIG. 7 is a view illustrating an arrangement relationship between unit stator cores disposed adjacent to each other and insulators in the motor according to the embodiment.

FIG. 7 is a view illustrating an arrangement relationship between the unit stator cores disposed adjacent to each other and the insulators in the motor according to the embodiment.

Referring to FIG. 7, the insulators 420 may be disposed in a state in which the unit stator cores 410a are disposed adjacent to each other in the circumferential direction. Alternatively, the unit stator cores 410a on which the insulators 420 are disposed may also be disposed in the circumferential direction.

Accordingly, the protrusions 424 of the insulators 420 which are adjacent to each other may be disposed to cover one portions of the yoke 411 of the stator core 410.

Regions in which the unit yokes 411a of the unit stator core 410a are in contact with and meet each other may be formed on the upper surface and the lower surface of the stator core 410. In this case, regions A disposed on the upper surface and the lower surface of the yoke 411 may be referred to as contact regions among the regions in which the unit yokes 411a are in contact with and meet each other.

In addition, the protrusion 424 may be disposed to cover one portion of the region A.

As illustrated in FIG. 7, the protrusion 424 may be disposed to cover an inner side of the region A. Accordingly, only one outer portion of the region A is exposed due to the protrusion 424. In this case, the region A exposed due to the protrusion 424 may be provided as a welding point A1. In this case, the region A exposed due to the protrusion 424 may be referred to as an exposed region.

In addition, the welding portion Y may be formed by welding the exposed region A. That is, the welding portion Y may be formed on the welding point A1 which is a boundary region between the unit stator cores 410a. In this case, the welding portion Y may be formed on the upper and lower surfaces, on which the protrusions 424 are not disposed, of the stator core 410 to have a predetermined width W3 in the radial direction.

In this case, the width W3 of the welding portion Y in the radial direction may be 0.4 to 0.6 times the width W1 of the yoke 411 or the yoke part 411b in the radial direction. The width W3 of the welding portion Y in the radial direction may be 0.5 times the width W1 of the yoke 411 in the radial direction. Accordingly, since the air gap, which is wider than that of a case in which the welding portion Y is formed on an entirety of the region A, may be secured, the welding portion Y may be formed on one exposed portion of the region A, and thus the cogging torque and the torque ripple of the motor 1 may be further reduced.

Meanwhile, in an example of the insulator 420 of the motor 1, the protrusions 424 are used to cover one portions of the upper surface and the lower surface of the yoke 411, but the present invention is not necessarily limited thereto.

For example, when the welding portion Y may be formed to have the preset width W3 in the radial direction, the protrusion 424 may also not be formed on the insulator 420.

However, when the welding portion Y is formed in a state in which the insulator 420 is disposed on the stator core 410, the protrusion 424 may inhibit the welding portion Y from being excessively formed. In addition, since the welding portion Y may be formed to have the preset width W3 in the radial direction due to the protrusion 424, constant values of the cogging torque and the torque ripple may be maintained so that constant quality of the motor 1 may be maintained.

Referring to FIG. 2, the welding portions Y may be formed on the upper surface and the lower surface of the yoke 411. In this case, the welding portion Y may be disposed at an outer side of the upper surface of the yoke 411. For example, the welding portion Y may be formed around the welding point A1.

In addition, the welding portion Y may be formed through a laser welding process.

Figure 8:
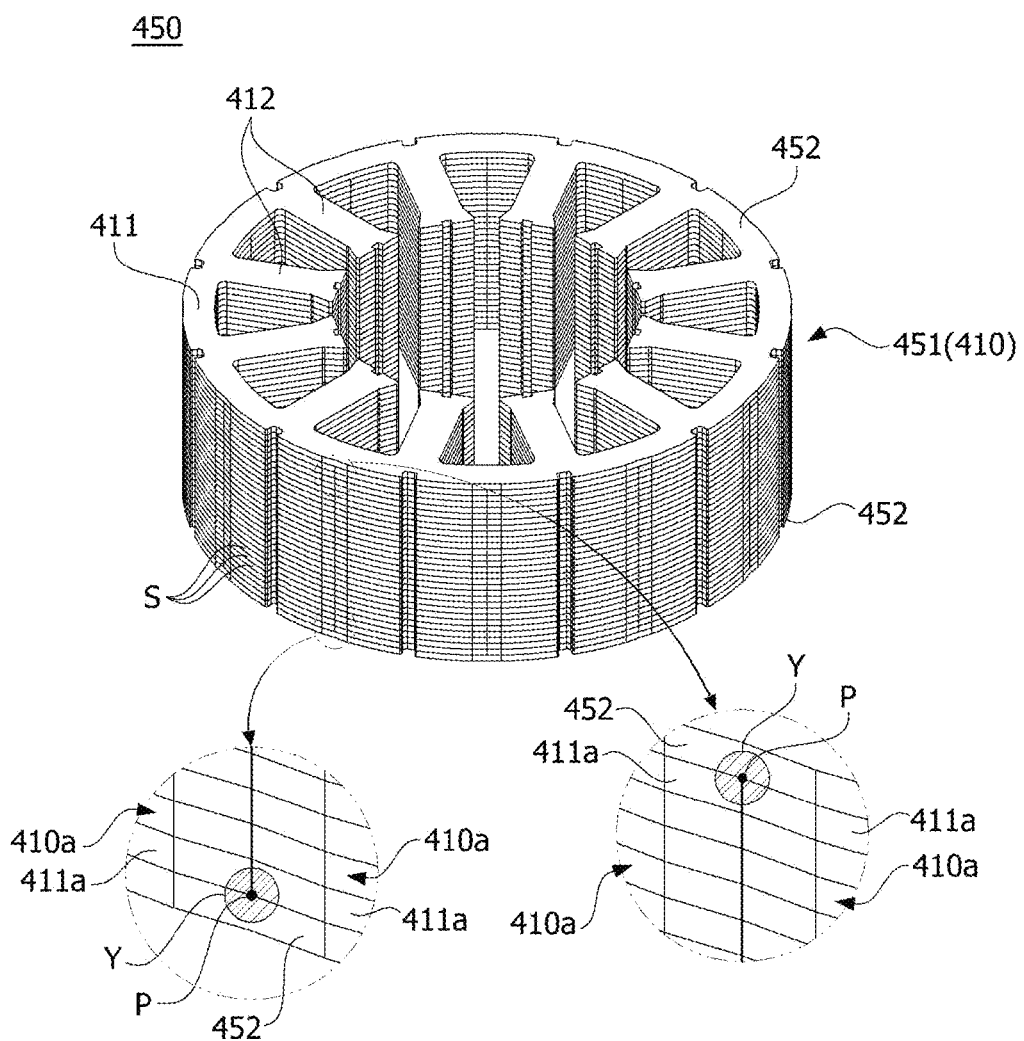
FIG. 8 is a perspective view illustrating another example of the stator core of the motor according to the embodiment.
Figure 9:
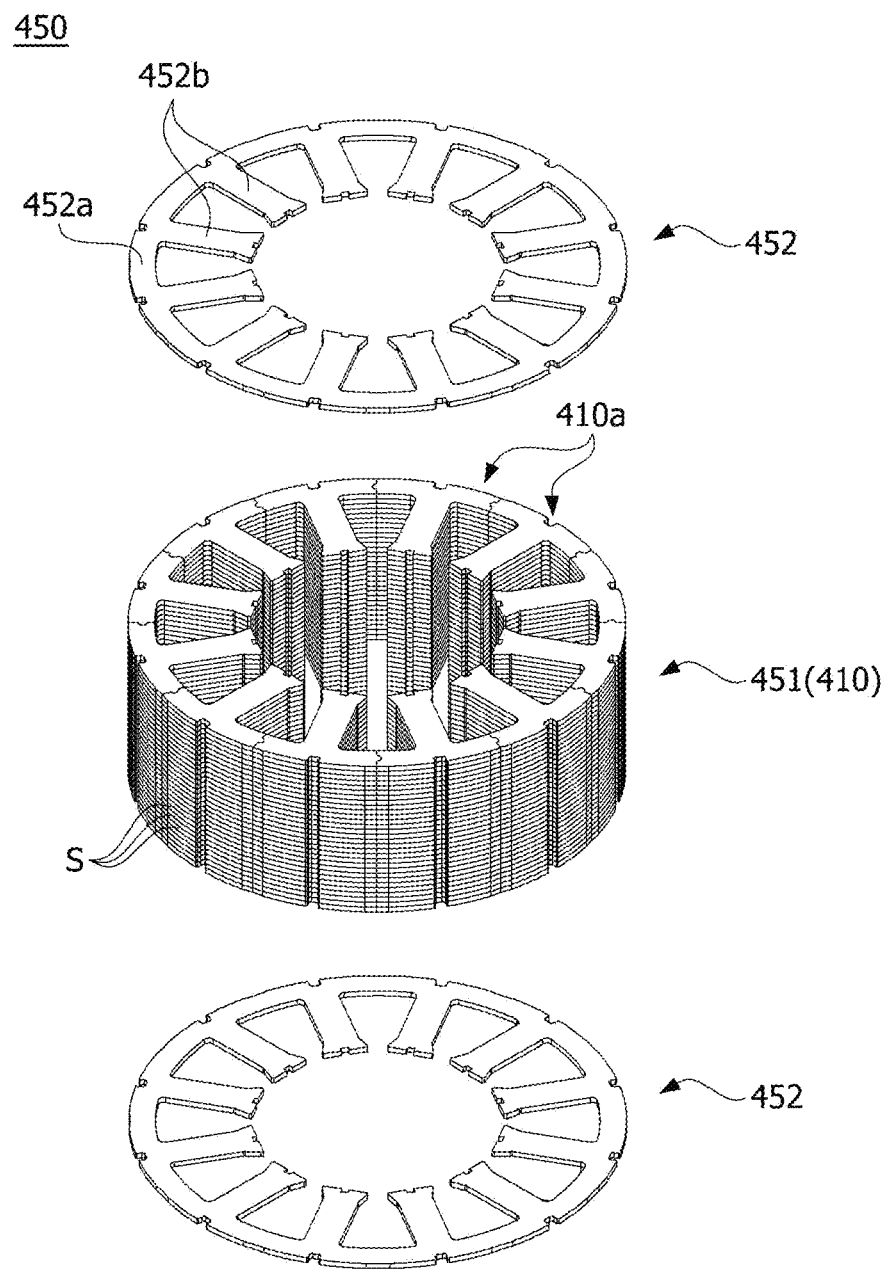
FIG. 9 is an exploded perspective view illustrating another example of the stator core of the motor according to the embodiment.

FIG. 8 is a perspective view illustrating another example of the stator core of the motor according to the embodiment, and FIG. 9 is an exploded perspective view illustrating another example of the stator core of the motor according to the embodiment.

Instead of the stator core 410 according to one example, a stator core 450 according to another example may be disposed in a stator 400. In this case, the stator core 450 according to another example may be referred to as a second stator core.

When the stator core 450 according to another example is described with reference to FIGS. 8 and 9, since the same symbols refer to the same components of the stator core 410 according to one example, the detailed descriptions will be omitted.

Referring to FIGS. 8 and 9, the stator core 450 may include a stator core body 451 formed by arranging a plurality of unit stator cores 410a in a circumferential direction and cover sheets 452 disposed on and below the stator core body 451. In addition, unit yokes 411a of the unit stator core 410a may meet at regions, and welding portions Y may be formed at one points P at which the regions meet outer circumferential surfaces of the cover sheets 452. Accordingly, the stator core 450 may include a yoke 411 and a plurality of teeth 412 protruding from the yoke 411 in a radial direction.

That is, there is a difference in that the cover sheets 452 may be disposed on and below the stator core 450 according to another example when compared to the stator core 450. In addition, there is a difference in that positions of the welding portions Y of the stator core 450 according to another example are different from the welding portions Y formed on the stator core 410.

For example, the cover sheets 452 may include an upper cover sheet disposed in an upper portion and a lower cover sheet disposed in a lower portion of the unit stator core 410a. In addition, the welding portions Y may be formed at boundary portions between sheets disposed at uppermost sides of the unit stator cores 410a and the upper cover sheet and between sheets disposed at lowermost sides of the unit stator cores 410a and the lower cover sheet.

The cover sheets 452 may support an upper portion and a lower portion of the stator core body 451.

Referring to FIG. 9, the cover sheet 452 may include a yoke part 452a having a ring shape and a plurality of tooth parts 452b protruding from the yoke part in the radial direction. In this case, the yoke part 452a and the plurality of tooth parts 452b may be integrally formed.

In this case, when viewed from above, the unit stator core 410a may be formed by, in a shaft direction, stacking sheets S including yoke parts 411a having a ring shape and tooth parts 412b protruding in the radial direction. Accordingly, tooth parts 412b of the sheets S may overlap tooth parts 452b of the cover sheets 452 in the shaft direction.

The welding portions Y of the stator core 450 may be formed at one points P at which the regions meet the outer circumferential surface of the cover sheet 452, wherein the unit yokes 411a of the unit stator core 410a may meet in the regions. In this case, the one points P may be provided as welding points.

Accordingly, the welding portions Y may connect the sheets S disposed at an uppermost layer and a lowermost layer of the stator core body 451 to the cover sheets 452 so as to fix the cover sheets 452 to the stator core body 451.

In this case, since point-welding is performed at the welding portions Y of the stator core 450, a cogging torque and a torque ripple of the motor 1 may be reduced when the air gaps are considered. Accordingly, noise and vibration of the motor 1 may also be reduced.

As illustrated in FIG. 1, the shaft 500 may be rotatably supported by the bearings 10 in the housing 100. In addition, the shaft 500 may be rotated in conjunction with rotation of the rotor 300.

The busbar 600 may be disposed on the stator 400.

In addition, the busbar 600 may be electrically connected to the coil 430 of the stator 400.

The busbar 600 may include a busbar body and a plurality of terminals disposed in the busbar body. In this case, the busbar body may be a mold product formed through an injection molding process. In addition, each of the terminals may be electrically connected to the coil 430 of the stator 400.

The sensor part 700 may detect a magnetic force of a sensing magnet installed to rotate in conjunction with the rotor 300 to check a present position of the rotor 300 so as to detect rotation of the shaft 500.

The sensor part 700 may include a sensing magnet assembly 710 and a printed circuit board (PCB) 720.

The sensing magnet assembly 710 is coupled to the shaft 500 to rotate in conjunction with the rotor 300 so as to detect the position of the rotor 300. In this case, the sensing magnet assembly 710 may include sensing magnets and a sensing plate. The sensing magnets and the sensing plate may be coaxially coupled.

The sensing magnets may include main magnets disposed close to a hole forming an inner circumferential surface thereof in the circumferential direction and sub-magnets.

The main magnets may be arranged like the drive magnets inserted into the rotor 300 of the motor.

The sub-magnets may be divided further than the main magnets so that the sub-magnets may be formed to have poles of which the number is greater than the number of poles of the main magnets. Accordingly, a rotation angle may be divided and measured more precisely, and thus the motor may be driven more smoothly.

The sensing plate may be formed of a metal material having a disc shape. The sensing magnet may be coupled to an upper surface of the sensing plate. In addition, the sensing plate may be coupled to the shaft 500. In this case, a hole through which the shaft 500 passes may be formed in the sensing plate.

A sensor configured to detect a magnetic force of the sensing magnets may be disposed on the PCB 720. In this case, a Hall integrated circuit (IC) may be provided as the sensor. In addition, the sensor may detect changes in an N-pole and an S-pole of the sensing magnet to generate a sensing signal.

While the present invention has been described with reference to the exemplary embodiments thereof, it will be understood by those skilled in the art that various changes in form and details may be made therein without departing from the spirit and scope of the invention as defined by the appended claims.

| REFERENCE NUMERALS |
| --- |
| 1: MOTOR |
| 100: HOUSING |
| 200: COVER |
| 300: ROTOR |
| 310: ROTOR CORE |
| 320: MAGNET |
| 400: STATOR |
| 410, 450: STATOR CORE |
| 410a: UNIT STATOR CORE |
| 411: YOKE |
| 412: TOOTH |
| 420: INSULATOR |
| 424: PROTRUSION |
| 430: COIL |
| 500: SHAFT |
| 600: BUSBAR |
| 700: SENSOR PART |
| Y: WELDING PORTION |

The invention claimed is:

1. A motor comprising:
a shaft;
a rotor coupled to the shaft; and
a stator disposed to correspond to the rotor,
wherein the stator includes a stator core formed by arranging a plurality of unit stator cores in a circumferential direction, welding portions connecting the plurality of unit stator cores, an insulator disposed on the stator core, and a coil wound around the insulator,
wherein the insulator includes a body around which the coil is wound, an inner guide protruding from an inner side of the body in a shaft direction, an outer guide protruding from an outer side of the body in the shaft direction, and protrusions protruding from the outer guide in the circumferential direction,
wherein each unit stator core includes a unit yoke having an arc shape and a unit tooth protruding from the unit yoke,
wherein the protrusions are disposed to cover one portion of each of the upper and lower surfaces of the unit yoke, and
wherein the welding portions are disposed on the upper and lower surfaces, on which the protrusions are not disposed, of the unit yoke.

2. The motor of claim 1, wherein a width of the welding portion in a radial direction is 0.4 to 0.6 times a width of the unit yoke in the radial direction.

3. The motor of claim 1, comprising cover sheets disposed on the stator core, wherein the cover sheet includes a yoke part having a ring shape and a plurality of tooth parts protruding from the yoke part in a radial direction, and the yoke part of the cover sheet overlaps a yoke of the stator core in the shaft direction.

4. The motor of claim 3, wherein the welding portion is disposed on each unit stator core and an outer surface of the cover sheet.

5. The motor of claim 4, wherein:

the cover sheet includes an upper cover sheet disposed on an upper portion of each unit stator core and a lower cover sheet disposed on a lower portion of each unit stator core; and the welding portions are disposed on a boundary portion between a sheet disposed at an uppermost side of each unit stator core and the upper cover sheet, and a boundary portion between a sheet disposed at a lowermost side of each unit stator core and the lower cover sheet.

6. The motor of claim 4, wherein unit stator cores disposed adjacent to each other meet at a region, and the welding portion is formed at one point (P) at which the region meets an outer circumferential surface of the cover sheet.

7. The motor of claim 1, wherein a width (W2) of the protrusion in a radial direction is smaller than a width (W4) of the outer guide in the radial direction.

8. The motor of claim 1, wherein:

the rotor includes a rotor core and ten magnets disposed on an outer circumferential surface of the rotor core in the circumferential direction; and the number of teeth of the stator core is twelve.

9. The motor of claim 1, wherein the protrusions of the insulators disposed adjacent to each other on the stator core in the circumferential direction are disposed to be spaced apart from each other to expose welding points on which the welding portions are formed.

* * * * *